US010350939B2

(12) United States Patent
Chinavare et al.

(10) Patent No.: US 10,350,939 B2
(45) Date of Patent: Jul. 16, 2019

(54) LIGHTWEIGHT AERODYNAMIC WHEEL ASSEMBLY

(71) Applicant: Lacks Enterprises, Inc., Grand Rapids, MI (US)

(72) Inventors: Kevin Chinavare, Middleville, MI (US); James Ardern, Grand Rapids, MI (US); Garry Van Houten, Middleville, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 178 days.

(21) Appl. No.: 14/090,758

(22) Filed: Nov. 26, 2013

(65) Prior Publication Data
US 2014/0159469 A1    Jun. 12, 2014

Related U.S. Application Data

(60) Provisional application No. 61/798,486, filed on Mar. 15, 2013, provisional application No. 61/793,605, (Continued)

(51) Int. Cl.
*B60B 3/10* (2006.01)
*B60B 7/02* (2006.01)
(Continued)

(52) U.S. Cl.
CPC .......... *B60B 3/10* (2013.01); *B60B 7/02* (2013.01); *B60B 7/06* (2013.01); *B60B 7/18* (2013.01);
(Continued)

(58) Field of Classification Search
CPC .... B60B 7/18; B60B 7/06; B60B 7/02; B60B 3/10; B60B 1/08; B60B 2900/111; B60B 2900/1216; B60B 7/008
(Continued)

(56) References Cited

U.S. PATENT DOCUMENTS 1,346,865 A  *  7/1920  Walther .................... B60B 1/00
                                                      301/65
2,049,908 A  *  8/1936  Johnson .................. B60B 17/00
                                                      295/26
(Continued)

FOREIGN PATENT DOCUMENTS

DE   102007042609 A1   3/2009
DE   202009013418 U1   2/2011
(Continued)

OTHER PUBLICATIONS

International Search Report dated Mar. 28, 2014 (PCT/US2013/071993).
European International Search Report dated Aug. 30, 2017.

*Primary Examiner* — Kip T Kotter
(74) *Attorney, Agent, or Firm* — John S. Artz; Dickinson Wright PLLC (57) ABSTRACT

A wheel assembly including a wheel and a wheel clad. The wheel includes a wheel outer rim portion, a wheel inner hub portion adapted to receive an axle therethrough, and a plurality of wheel spokes extending radially between the wheel outer rim portion and the wheel inner hub portion. The wheel has an outer surface having a plurality of wheel turbine openings therein. The wheel turbine openings have a first area. The wheel clad includes a clad outer rim portion axially aligned with at least a portion of the wheel outer rim portion, a clad inner hub portion axially aligned with at least a portion of the wheel inner hub portion, and a plurality of clad spokes extending radially between the clad outer rim portion and clad inner hub portion. The clad has a plurality of clad turbine openings each having a second area. The second area is substantially less than the first area. The clad/wheel assembly has a drag coefficient of substantially less than that of the wheel by itself.

18 Claims, 11 Drawing Sheets

Related U.S. Application Data filed on Mar. 15, 2013, provisional application No. 61/729,903, filed on Nov. 26, 2012.

(51) Int. Cl.
  *B60B 7/06* (2006.01)
  *B60B 7/18* (2006.01)
  *B60B 1/08* (2006.01)
  *B60B 3/02* (2006.01)

(52) U.S. Cl.
  CPC . *B60B 1/08* (2013.01); *B60B 3/02* (2013.01); *B60B 2310/318* (2013.01); *B60B 2900/111* (2013.01); *B60B 2900/1216* (2013.01); *Y02T 10/88* (2013.01)

(58) Field of Classification Search
  USPC .............................. D12/209, 210, 211, 212
  See application file for complete search history.

(56) References Cited

U.S. PATENT DOCUMENTS

| | | | | |
|---|---|---|---|---|
| 4,035,895 A * | 7/1977 | Lester | ..................... | B23P 11/02 |
| | | | | 29/447 |
| 4,047,764 A * | 9/1977 | Lester | ..................... | B60B 1/08 |
| | | | | 301/105.1 |
| 5,597,213 A * | 1/1997 | Chase | ..................... | B60B 7/00 |
| | | | | 301/37.11 |
| 6,637,832 B2 | 10/2003 | Wrase | | |
| 6,729,695 B2 | 5/2004 | Woelfel | | |
| 6,998,001 B2 | 2/2006 | Woelfel | | |
| 7,784,185 B2 * | 8/2010 | Murray | ................. | B60B 7/0053 |
| | | | | 156/79 |
| 2001/0020514 A1 * | 9/2001 | Chase | ................. | B29C 44/1233 |
| | | | | 156/292 |
| 2002/0153763 A1 * | 10/2002 | Van Houten | .......... | B60B 7/0013 |
| | | | | 301/37.43 |
| 2002/0185908 A1 * | 12/2002 | Woelfel | ..................... | B60B 7/18 |
| | | | | 301/37.43 |
| 2003/0067212 A1 * | 4/2003 | Wrase | ..................... | B60B 7/004 |
| | | | | 301/37.43 |
| 2004/0144475 A1 * | 7/2004 | Woelfel | ............... | B29C 44/1233 |
| | | | | 156/79 |
| 2004/0169413 A1 | 9/2004 | Woelfel | | |
| 2005/0073191 A1 * | 4/2005 | Gerard | ...................... | B60B 5/02 |
| | | | | 301/37.101 |
| 2006/0043782 A1 * | 3/2006 | Houten | ................. | B60B 7/0013 |
| | | | | 301/37.43 |
| 2007/0157470 A1 | 7/2007 | Murray | | |
| 2009/0179480 A1 * | 7/2009 | Modlinger | ............... | B60B 19/10 |
| | | | | 301/6.3 |
| 2009/0224597 A1 * | 9/2009 | Wood | .................... | B60B 7/0013 |
| | | | | 301/35.61 |
| 2010/0237685 A1 * | 9/2010 | Yee | ........................... | B60B 1/08 |
| | | | | 301/37.43 |
| 2011/0148181 A1 * | 6/2011 | Silva de Carvalho | ...................... | |
| | | | | B60B 7/0046 |
| | | | | 301/37.102 |
| 2013/0306217 A1 * | 11/2013 | Risko | ..................... | G01N 25/72 |
| | | | | 156/64 |
| 2014/0159469 A1 | 6/2014 | Chinavare | | |
| 2014/0265534 A1 | 9/2014 | Chinavare | | |

FOREIGN PATENT DOCUMENTS

| | | | | |
|---|---|---|---|---|
| DE | 102010034417 A1 * | 2/2012 | ............. | B60B 7/002 |
| EP | 1920948 A2 | 5/2008 | | |
| WO | 03031204 A2 | 4/2003 | | |

\* cited by examiner

|   |   | 20 Spoke OEM Baseline | eVOLVE Backbone (No Clad) | eVOLVE Heavy | eVOLVE |
|---|---|---|---|---|---|
| 1 | Moment of Inertia (Kg*M²) | 0.324 | 0.225 | 0.314 | 0.268 |
| 2 | Moment of Inertia % Improvement From Baseline | | 22.22% | 3.09% | 17.28% |
| 3 | Mass (Kg) | 10.6 | 8.1 | 10.75 | 8.67 |
| 4 | Mass % Improvement From Baseline | | 23.58% | -1.42% | 18.21% |
| 5 | Power Required Due to Inertia - Rotational Acceleration (0 mph - 70 mph) (Hp) | 1.51 | 1.17 | 1.46 | 1.25 |
| 6 | Inertia % Improvement From Baseline (0 mph - 70 mph) | | 22.20% | 3.05% | 17.30% |
| 7 | Power Required Due to Mass - Translational Acceleration (0 mph - 70 mph) (Hp) | 5.26 | 4.02 | 5.33 | 4.30 |
| 8 | Mass % Improvement From Baseline (0 mph - 70 mph) | | 23.58% | -1.43% | 18.19% |
| 9 | Power Required Due to Mass & Inertia (0 mph - 70 mph) | 6.77 | 5.19 | 6.79 | 5.55 |
| 10 | Power % Improvement Due to Mass & Inertia From Baseline (0 mph - 70 mph) | | 23.28% | -0.41% | 18.00% |
| 11 | Fuel Economy (Aero & Mass) - (50 mph)(mpg) | 55 | 56.1 | 55.9 | 56.2 |
| 12 | Fuel Economy (Aero & Mass) % Improvement From Baseline (50 mph) | | 2.00% | 1.64% | 2.18% |

Same Aero →  (spans eVOLVE Heavy and eVOLVE columns)

the impact of the wheels and their effect on
LIGHTWEIGHT AERODYNAMIC WHEEL ASSEMBLY

CROSS-REFERENCE TO RELATED APPLICATIONS

The present application claims priority to U.S. Provisional Patent Application Ser. No. 61/729,903, entitled "A Lightweight Aerodynamic Wheel Assembly", filed Nov. 26, 2012, U.S. Provisional Patent Application Ser. No. 61/793,605, entitled "Aerodynamically Efficient Wheel Spoke Design", filed Mar. 15, 2013, and U.S. Provisional Patent Application Ser. No. 61/798,486, entitled "Partial Wheel Cladding", filed Mar. 15, 2013.

TECHNICAL FIELD

The present disclosure relates to a vehicle wheel assembly that provides improved fuel efficiency. More particularly, the present disclosure relates to a wheel assembly that is constructed of lighter weight and with improved aerodynamic characteristics as compared to prior vehicle wheel assemblies.

BACKGROUND OF THE INVENTION

With recent efforts directed toward energy conservation along with the continuing escalation of fuel prices, the automotive industry has put an emphasis on increasing the fuel economy of vehicles that are put onto the road. Efforts to improve the fuel economy of vehicles have resided in improving the operation and efficiency of their engines, reducing the weight of their bodies and chassis, and improving the aerodynamic characteristics of their bodies. While great strides have been made in enhancing vehicle fuel economy as a result of improvements in these areas, there is still significant room for further advancement.

Currently, the impact of the wheels and their effect on vehicle aerodynamics as well as fuel economy has been largely unappreciated. While there have been efforts to design and manufacture lighter weight wheels, such as through the removal of material from the spokes or the backsides of the wheel, the primary goal of these efforts has generally been cost considerations and not aerodynamics or fuel economy.

More recently, the potential aerodynamic impact of vehicle wheels themselves has been considered. These considerations have largely ignored the fact that most wheel assemblies today employ covers or other structures over the wheel outboard surface that are designed to enhance the aesthetics of the wheel. Consequently, any aerodynamic benefit that may result from the design of the wheel alone is not maximized when a wheel cover or other aesthetic feature is secured to the outboard surface of the wheel that does not take into account the aerodynamics, total mass, and optimized mass moment of inertia of the overall wheel assembly.

It would thus be desirable to provide a wheel assembly that overcomes the disadvantages associated with current wheel assemblies and helps contribute to improved fuel efficiency of a vehicle.

SUMMARY OF THE INVENTION

It is therefore an aspect of the present disclosure to provide a wheel assembly for a vehicle that has improved aerodynamics while maintaining the lowest possible total mass and mass moment of inertia.

It is another aspect of the present disclosure to provide a wheel assembly that provides improved fuel efficiency for a vehicle.

It is a further aspect of the present disclosure to provide a method where the wheel and cladding are designed together as a single unit to optimize both weight, mass moment of inertia and aerodynamics.

In accordance with the above and the other aspects of the present disclosure, a vehicle wheel assembly is provided. The wheel assembly includes a wheel outer rim portion, a wheel inner hub portion adapted to receive an axle therethrough, and a plurality of wheel spokes extending radially between the wheel outer rim portion and the wheel inner hub portion. The wheel outer rim portion, the wheel inner hub portion, and the wheel spokes cooperate to form a wheel surface having an inboard side and an outboard side. The wheel outer surface includes a plurality of wheel turbine openings formed between adjacent ones of the plurality of spokes. Each of the plurality of wheel turbine openings has a perimeter that defines a first area. The wheel assembly also includes a wheel clad that is secured to the outboard surface of the wheel. The wheel clad includes a clad outer rim portion axially aligned with at least a portion of the wheel outer rim portion. The wheel clad also includes a clad inner hub portion axially aligned with at least a portion of the wheel inner hub portion. The wheel clad additionally includes a plurality of clad spokes extending radially between the clad outer rim portion and the clad inner hub portion. The plurality of clad spokes are at least partially axially aligned with the wheel spokes. The clad outer rim portion, the clad inner hub portion and the clad spokes define a clad surface having an inboard side and an outboard side. The wheel clad is permanently secured to the wheel such that the clad inboard side faces the wheel outboard side. The clad surface has a plurality of clad turbine openings. The plurality of clad turbine openings each include a perimeter that defines a second area. The second area is substantially less than the first area. Additionally, the wheel assembly provides a significant drag coefficient improvement for the vehicle as compared to the wheel alone.

In accordance with still another aspect of the disclosure, a wheel assembly is provided that includes a wheel outer rim portion, a wheel inner hub portion adapted to receive an axle therethrough, and a plurality of wheel spokes extending radially between the wheel outer rim portion and the wheel inner hub portion. The wheel outer rim portion, the wheel inner hub portion and the wheel spokes cooperate to form a wheel surface having an inboard side and an outboard side. The wheel surface includes a plurality of wheel turbine openings formed between adjacent ones of the plurality of spokes. The wheel assembly also includes a wheel clad that is secured to the outboard side of the wheel. The wheel clad includes a clad outer rim portion axially aligned with at least a portion of the wheel outer rim portion. The wheel clad includes a clad inner hub portion axially aligned with at least a portion of the wheel inner hub portion and a plurality of clad spokes extending radially between the clad outer rim portion and clad inner hub portion. The clad outer rim portion, the clad inner hub portion, and the clad spokes define a clad surface having an inboard side and an outboard side. The wheel clad is secured to the wheel with the clad inboard side facing the wheel outboard side such that a gap is defined between the clad inboard side and the wheel outboard side. The clad surface has a plurality of clad turbine openings formed therein. An adhesive is located within the gap. The combined wheel assembly yields a substantial drag coefficient improvement as compared to the wheel alone.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE INVENTION

Figure 1:
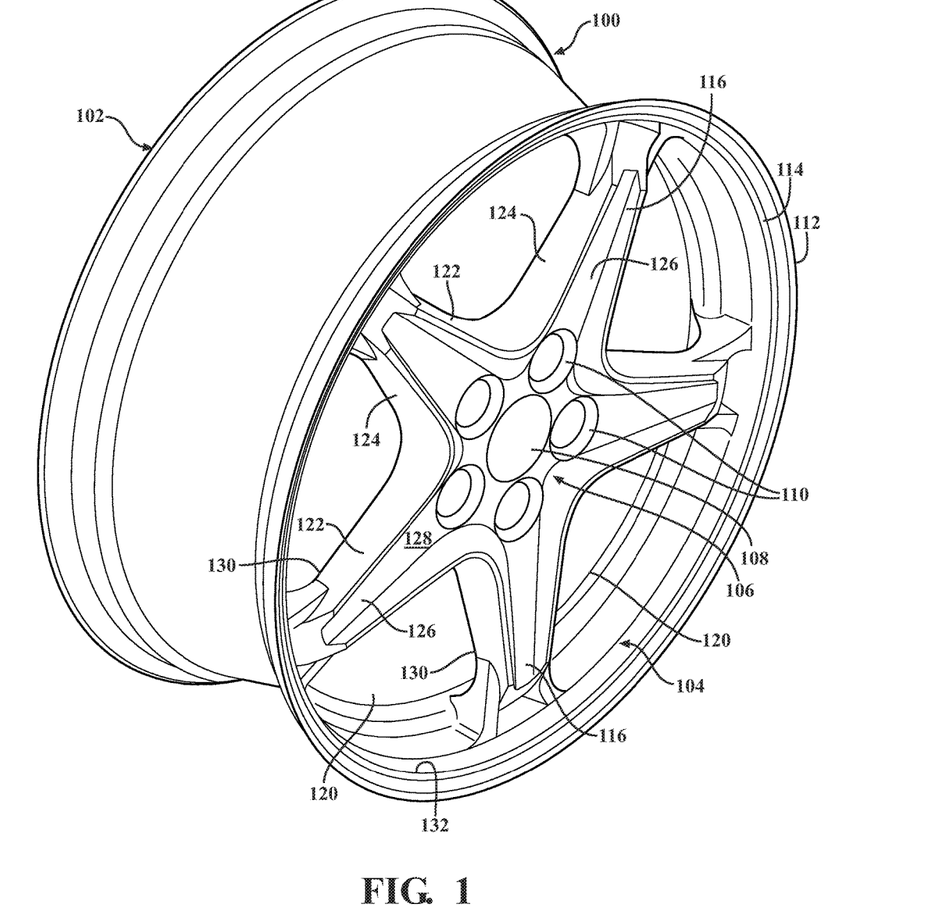
FIG. 1 is a perspective view of a wheel for a wheel assembly in accordance with an aspect of the present disclosure.
Figure 2:
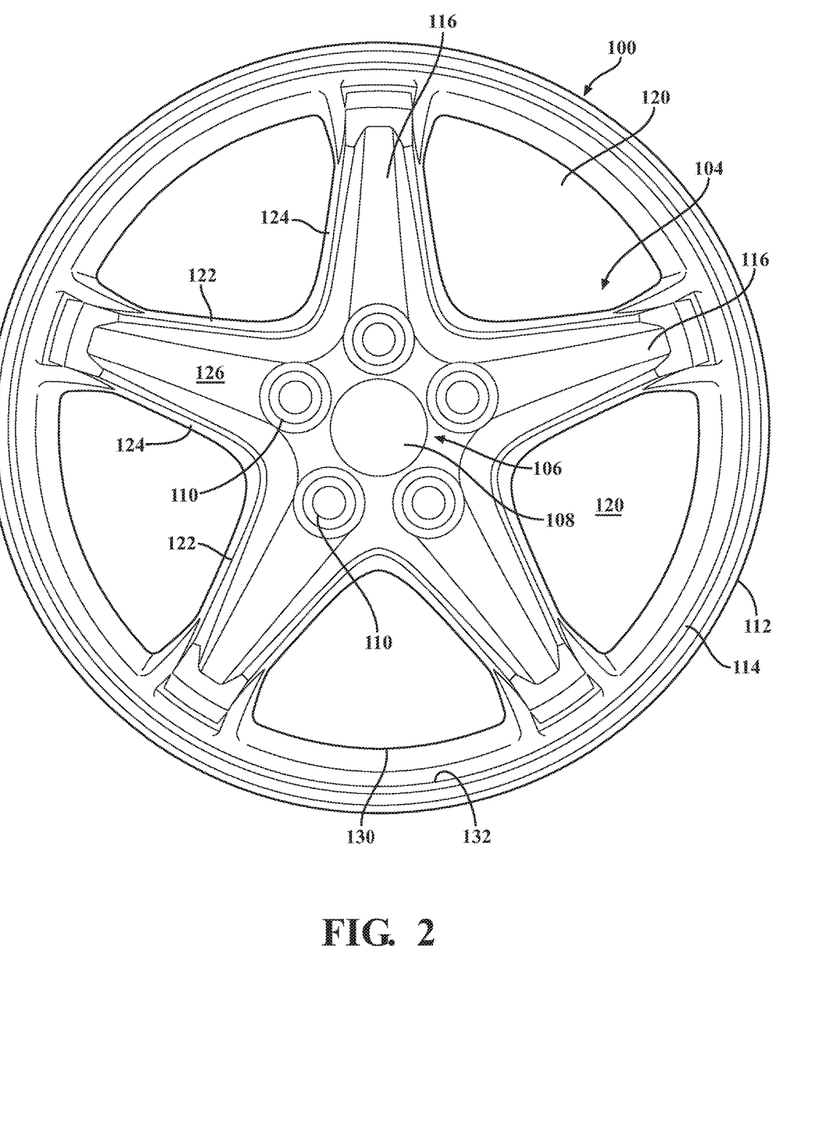
FIG. 2 is front view of the wheel of FIG. 1.
Figure 3:
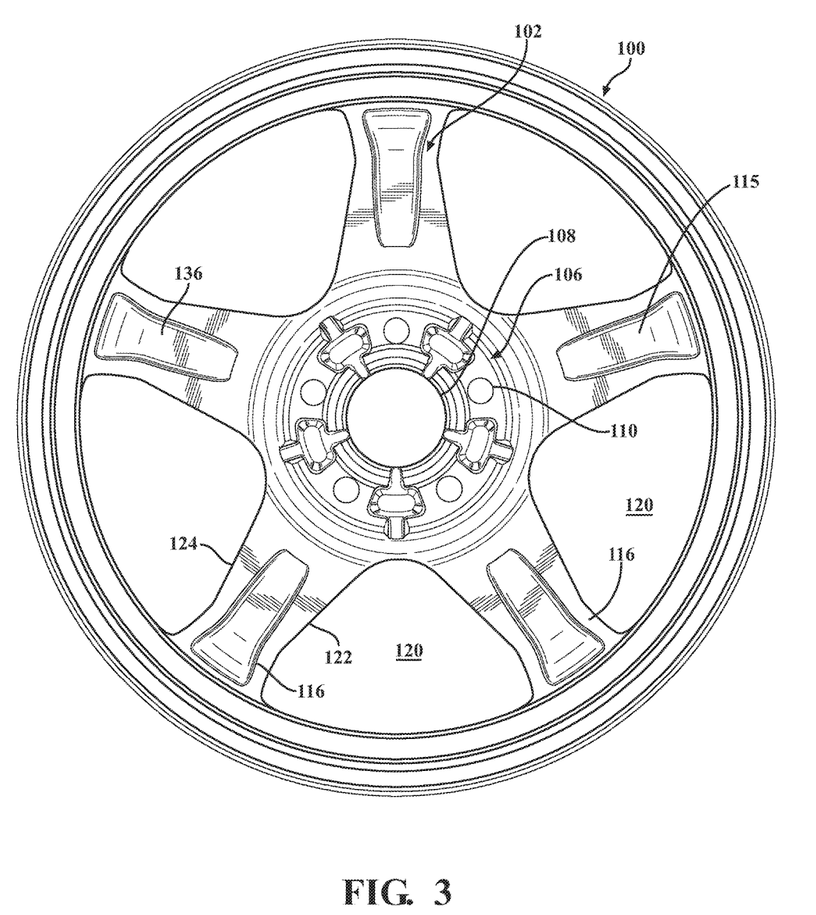
FIG. 3 is a rear view of the wheel of FIG. 1.
Figure 4:
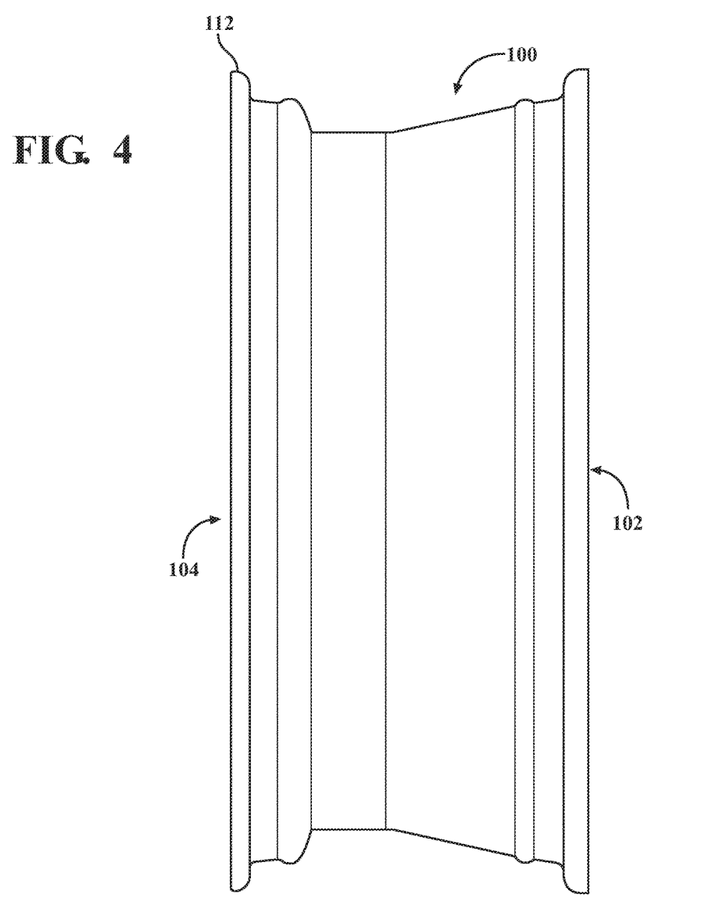
FIG. 4 is a side view of the wheel of FIG. 1.
Figure 5:
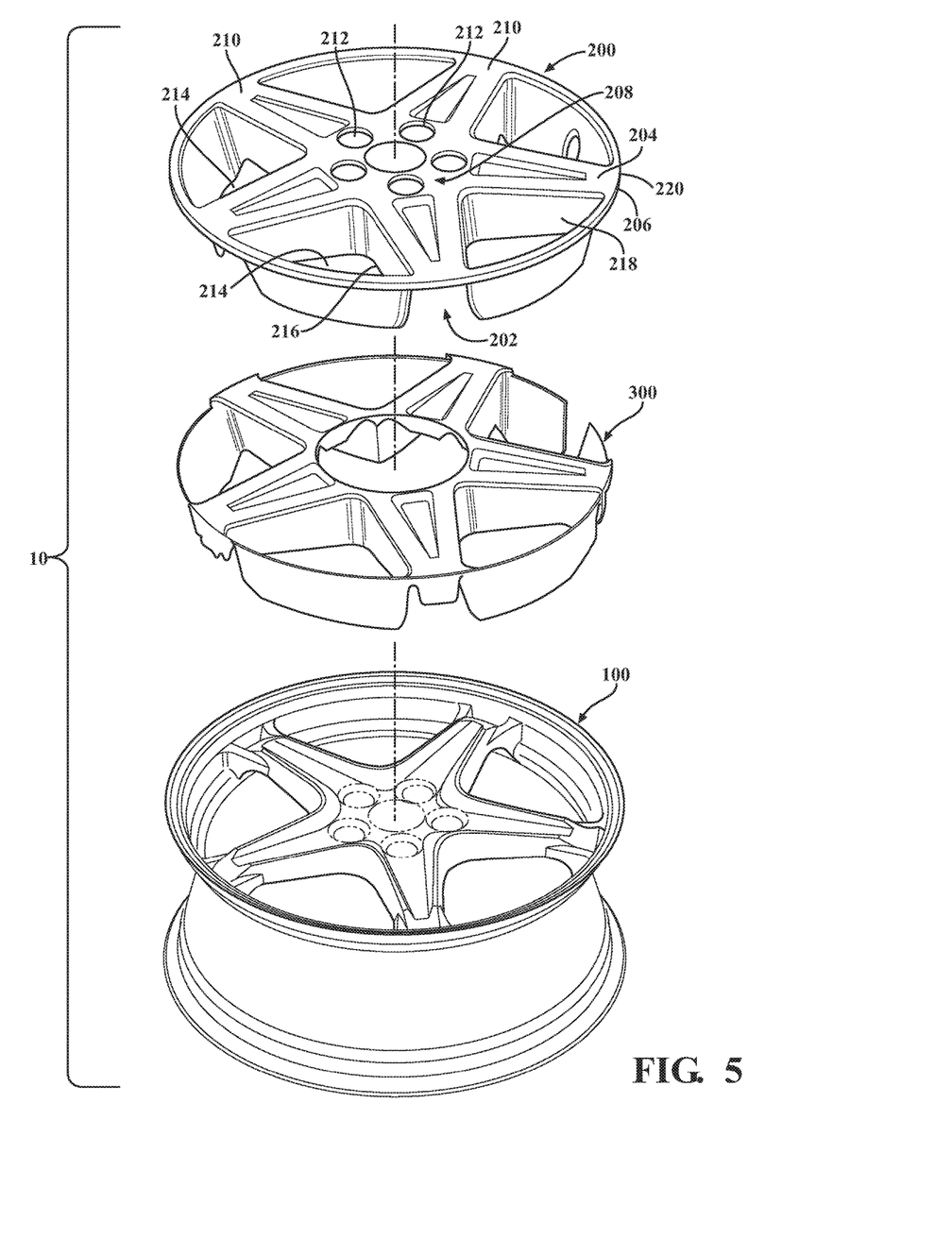
FIGS. 5A and 5B are schematic exploded views of a wheel assembly in accordance with an aspect of the present disclosure.

For purposes of description herein, the terms "upper", "lower", "right", "left", "rear", "front", "vertical", "horizontal", and derivatives thereof shall relate to the invention as oriented in FIG. 1 and are intended merely for purposes of illustration and are not intended to be limiting. It is to be understood that the invention may assume various alternative orientations and features, except where expressly specified to the contrary. It is also to be understood that the specific devices and processes illustrated in the attached drawings, and described in the following specification are exemplary embodiments of the inventive concepts defined in the appended claims. The specific dimensions and other physical characteristics relating to the aspects disclosed herein are not to be considered as limiting, unless the claims expressly state otherwise.

The present disclosure relates to a wheel assembly 10 for a vehicle that provides improved aerodynamics and yields increased fuel economy. It is contemplated that the wheel assembly 10 disclosed herein can provide fuel economy savings of at least 2 MPG. The amount of fuel economy savings can vary based upon other factors, including the configuration of the vehicle and whether the savings may be measured based on city or highway driving, and could be greater or less than 2 MPG. According to an aspect, assuming the same vehicle, the disclosed wheel assembly 10 can have benefits over conventional wheel assemblies. The disclosed wheel assembly 10 is intended for use with an automotive vehicle, such as a car or truck. In accordance with another aspect, the wheel assembly 10 could alternatively be used in connection with other types of vehicles.

Referring now to FIGS. 1 through 5A-B, which illustrate a wheel assembly 10 in accordance with an aspect of the disclosure. Pursuant to an aspect, the wheel assembly 10 includes a wheel 100 and a wheel cover or clad 200. The wheel clad 200 can be permanently secured to the wheel 100 by a suitable adhesive to form a completed wheel assembly 10. According to an aspect, the wheel clad 200 may be secured to the wheel 100 by a foam adhesive, as generally designated by reference number 300. According to another aspect, any other suitable adhesives may be employed. For example, a silicon adhesive, such as a one part or two part RTV adhesive 301, may be employed.

FIGS. 1 through 4 illustrate the wheel 100 of the wheel assembly 10 in accordance with an aspect of the disclosure. According to an aspect, the wheel 100 has an inboard side 102 and an outboard side 104 and includes an inner hub portion 106 having an opening 108 for receipt of an axle (not shown) therethrough. The hub portion 106 also includes a plurality of lug openings 110 formed therein which receive lug bolts (not shown), for securing the wheel 100 on the vehicle axle. The wheel 100 also includes a peripheral rim portion 112 with an outer peripheral flange surface 114. The wheel 100 also includes a plurality of wheel spokes 116 extending generally radially between the outer peripheral flange surface 114 and the inner hub portion 106. The outer peripheral flange surface 114, the inner hub portion 106, and the plurality of spokes 116 together define a plurality of wheel turbine openings 120. The wheel turbine openings 120 are generally defined by an inner boundary or footprint. The spokes and turbine openings may have a variety of different sizes, shapes and geometries and may be defined by a variety of different surfaces.

According to an aspect, the wheel 100 can be formed from any suitable material, such as aluminum or steel, as is conventional in the automotive industry. Other materials may alternatively be employed. According to a further aspect, the wheel clad 200 may be constructed of plastic or composite material. However, other suitable materials may be employed as may be preferred or dictated by the design constraints of the particular application. According to another aspect, the wheel clad 200 may have a metal plated outer surface, such as a chrome plated surface, to provide desirable aesthetics and to yield an appearance that the clad is an integral part of the wheel. Numerous structural combinations of wheel clads with chrome-plated outboard surfaces have attracted great interest from vehicle manufacturers, because they are lightweight, aesthetically pleasing and offer designers complete flexibility with regard to the aesthetic effect that can be created for a specific vehicle regardless of whether these vehicles use steel or aluminum wheels. The clad 200 may be formed by suitable injection molding processes.

In accordance with an aspect, the wheel 100 may be configured to be of lighter weight and have an optimized mass moment of inertia in order to contribute to the fuel economy savings of the wheel assembly 10. This can be accomplished according to the current disclosure by reducing the weight of the wheel as compared to prior wheels, as exemplarily discussed herein. Prior wheels, which are constructed of metal, such as steel or aluminum, employ aesthetic features on their outboard surface, which generally serve as a class A surface. According to another aspect of the disclosure, certain features normally formed of metal as part of the wheel can be disposed on the outer surface of the clad 200, which is constructed of a lighter weight material, such as plastic.

According to an aspect, the outboard surface 104 of the wheel 100 does not contribute to the aesthetics of the wheel. As such, the wheel 100 can be designed for structural integrity and/or purposes only. According to an aspect, the wheel 100 can include a plurality of mass reduction structures or features that allow the wheel and/or wheel assembly to be constructed of less material. As discussed in more detail below, structures or features may be disposed on the clad to optimize aerodynamic design surfaces and replaces materials formed on prior metal wheel surfaces. The mass reduction structures or features can be located in areas of the wheel 100 that do not impact structural integrity. The mass reduction structures can also be disposed in visible areas as, according to an aspect, the wheel surface does not contribute to wheel aesthetics.

According to an aspect, an exemplary mass reduction structure or feature may include removing material from the spokes 116 such that they employ less material than the spokes of prior wheels. According to an aspect, each spoke 116 may include a pair of opposing flanges 122, 124 that extend generally perpendicular with respect to the inboard side 102 and the outboard side 104 of the wheel 100. Each of the flanges 122, 124 may have a first thickness as measured between the inboard side 102 and the outboard side 104. The flanges 122, 124 may be connected by a web 126, which runs therebetween. The web 126 may have a second thickness as also measured between the inboard side 102 and the outboard side 104. The first thickness is greater than the second thickness. Put another way, a front face 128 of each spoke 116 may be recessed with respect to the outer edge surfaces of the flanges 122, 124. By this configuration each spoke 116 may generally have an I-beam configuration 115 that provides necessary strength while utilizing less material. While the spokes 116 may employ less material, they still can provide sufficient strength through the resistance of shear stress and bending moments. It will be appreciated that the rear face each spoke 116 may be similarly recessed. It will also be appreciated that the spokes 116 could take on other configurations, including where the flanges 122, 124 are oriented to run parallel to the inboard and outboard surfaces 102, 104 of the wheel 100.

In accordance with other aspects, the spokes 116 could employ other shapes, sizes and configurations that provide spokes 116 employing less material. Alternatively or additionally, the wheel 100 could employ other structures to reduce weight and employ less material, including hollow pockets 136 on the inboard side 102 of the spokes 116 or wheel 100, hollow pockets on outboard side 104 of the spokes 116 or the wheel 102, or hollow cores within the center of the spokes 116 near the neutral axis of bending stress. According to another aspect, the wheel 100 could have more or less spokes than illustrated in the FIGs.

According to another aspect, a further mass reduction structure may or feature involve increasing the area of the wheel turbine openings 120 with respect to prior wheels to yield a lighter weight structure. Increasing the size and/or area of the wheel turbine openings 120 can result in the utilization of less material to form the wheel 100. This may be accomplished in conjunction with thinner and lighter spokes 116 as referenced above. By providing larger turbine openings 120, the wheel 100 can employ less material, optimizing for mass moment of inertial and total mass reduction and thus be constructed of a lighter weight. As is known, wheel assemblies generally employ turbine openings to provide styling options as well as to provide an airflow path to cool the brakes. It will be appreciated that the wheel turbine openings according to the present disclosure can have a variety of different shapes and sizes and can be located in different places on the wheel surface 100. Pursuant to a further aspect, another mass reduction structure or feature may involve decreasing the surface area of the outer peripheral flange surface 114 with respect to prior wheels.

As shown in the drawings, according to an aspect, each of the wheel turbine openings 120 may have a generally outwardly projecting V-shape. Pursuant to an aspect, the wheel turbine openings 120 are designed to provide improved fuel efficiency by increasing their size and have a first area ($A_1$) as defined by a wheel turbine opening perimeter 130. As shown, the wheel turbine opening perimeter 130 may be generally defined by inner surfaces 122, 124 of adjacent spokes 116 and an inner periphery 132 of the outer peripheral flange surface 114. The wheel turbine openings 120 can have a variety of different shapes and sizes, including non-uniform shapes. Additionally, any number of turbine openings 120 can be formed in the wheel surface.

With reference to FIGS. 5A and 5B, an exemplary wheel clad 200 of the disclosed wheel assembly 10 is illustrated. The wheel clad 200 has an inboard surface 202 and an outboard surface 204. The wheel clad 200 has a clad outer peripheral portion 206 that is intended to axially align with or overlie at least a portion of the wheel outer peripheral flange surface 114. The wheel clad 200 includes an inner opening portion 208 that can be axially aligned with at least a portion of the wheel inner opening portion 106. The wheel clad 200 also can include a plurality of clad spokes 210 that extend radially between the clad outer peripheral portion 206 and the clad inner opening portion 208. The clad spokes 210 may at least partially align with and overlap the wheel spokes 116. The clad outer peripheral portion 206, the clad inner opening portion 208, and the clad spokes 210 cooperate to define a plurality of clad turbine openings 214. The clad 200 also can include a plurality of lug bolt receiving holes 212 formed therein for receiving lugs. It will be appreciated that the clad turbine openings according to the present disclosure can have a variety of different sizes and can be located in different places on the clad 200.

The wheel clad 200 may be permanently secured to the wheel 100 such that the clad inboard side 202 faces the wheel outboard side surface 104. The plurality of clad turbine openings 214 can each have a clad turbine opening perimeter 216 that may be defined by opposing side surfaces 218 of adjacent clad spokes 210 and an inner periphery 220 of the clad outer rim portion 206. As shown, the opposing side surfaces 218 may extend downward toward the wheel outboard surface 104 in a generally planar fashion. The plurality of clad turbine openings 214 may be generally axially aligned with the wheel turbine openings 120, such that each clad turbine opening perimeter 216 is disposed entirely within a respective one of the wheel turbine openings 120. According to an aspect, each of the plurality of clad turbine openings 214 has a second area ($A_2$) defined by the clad turbine opening perimeter 216. Each of the plurality of clad turbine openings 214 may be substantially smaller in size than the plurality of wheel turbine openings 120. Put another way ($A_2$) may be substantially smaller than ($A_1$).

As shown, the clad 200 may have its outboard surface 204 designed for aerodynamic optimization. According to an aspect, the area ($A_1$) of the wheel turbine openings 120, as defined by the wheel turbine opening perimeter 130, may be significantly larger or greater than the area ($A_2$) of the clad turbine opening 214, as defined by the clad turbine opening perimeter 216. For example, according to one example, the area ($A_1$) of the wheel turbine openings 116 may be 18.829 inches$^2$ while the area ($A_2$) of the clad turbine openings 214 may be 15.624 inches$^2$. In accordance with this example, the second area ($A_2$) is at least 17% less than the first area ($A_1$). (15.624/18.829=0.8297×100=82.97%.) It will be appreciated that these dimensions and percentages are merely exemplary. A variety of other suitable dimensions and percentages may also be employed that yield a configuration where the area ($A_1$) of the wheel turbine openings 116 is substantially greater than the area ($A_2$) of the clad turbine openings 214. For example, the difference in turbine opening areas could be as small as 10% and could be greater than 25% or greater than 50%.

In accordance with a further aspect, a space or gap may be formed between the outboard side 104 of the wheel 100 and the inboard surface 202 of the clad 200. In accordance with an aspect, as the wheel 100 and the clad 200 are constructed to be of a lighter weight, less material is employed and thus a relatively large gap can exist therebetween when the wheel 100 and the clad 200 are assembled to form the wheel assembly 10. This can be partly due to the fact that the wheel may be thinner. Specifically, a large gap may exist in the region between the web 126 of each spoke 116 and the inboard surface 202 of the clad 200. Additionally, according to a further aspect, as the clad turbine opening perimeter 216 may be significantly smaller than the wheel turbine opening perimeter 130, a significant gap can also exist between the wheel spoke side surfaces 122, 124 and the clad spoke side surfaces 218. Similarly, a significant gap may exist between the inner periphery 132 of the wheel outer peripheral flange surface 114 and the inner periphery 220 of the clad outer peripheral portion 206.

According to an aspect, the entire gap 302 between the outboard side 104 of the wheel 100 and the inboard surface 202 of the clad 200 may be filled with a foam adhesive 300 to permanently attach the clad 200 to the wheel 100. The foam may be a foamed urethane adhesive/sealant that can be injected in liquid form between the wheel 100 and the clad 200 according to known processes. Alternatively, the foam may be performed and inserted between the wheel 100 and the clad 200. As discussed above, other suitable adhesives may be utilized.

According to still a further aspect, the clad turbine opening perimeter 216 has an innermost boundary that extends away from the outboard surface 204 of the clad 200 in the direction of the wheel outboard side 104. Similarly, the wheel turbine opening 130 perimeter has an innermost boundary. The innermost boundary of the wheel turbine opening perimeter 130 and the innermost boundary of the clad turbine opening perimeter 216 may extend outwardly away from the outboard surface 204 of the clad 200. According to an aspect, the wheel turbine opening perimeter 130 and the clad turbine opening perimeter 216 may lie in substantially the same horizontal plane adjacent the inboard side 102 of the wheel 100, which plane is perpendicular to the axis of rotation. According to another aspect, the adhesive that fills the area between the side surfaces 122, 124 of the wheel spokes 116 and the side surfaces 218 of the clad spokes 210 and may fill that area such that it is flush with the boundaries to form a relatively planar surface. This feature may provide enhanced aerodynamics by providing a flush interior surface.

The wheel assembly 10 as a whole can provide a significant drag coefficient reduction, total mass reduction, and reduced mass moment of inertia. In accordance with an aspect, the drag coefficient of the vehicle can be significantly reduced as compared to the base wheel structure by itself. For example, as determined through computational fluid dynamic analysis, the drag coefficient can be reduced through utilization of the present disclosure by at least 0.003 compared to the wheel itself. It will be appreciated that the amount of the reduction in the drag coefficient can vary and may be greater than 0.003 and as much as 0.006 or greater. It will be appreciated the reduction in drag coefficient may be less than 0.003 or greater than 0.006. The wheel assembly 10 also may reduce the energy required to accommodate pumping losses, or the "fan effect" that occurs as each spoke 116 rotates through the air. The disclosed wheel assembly 10 can provide airflow improvements that decrease energy usage or pumping losses. Additionally, the wheel 100 and the clad 200 may be designed such that at least one of the plurality of wheel spokes 116 and at least one of the plurality of clad spokes 210 cooperate to define a mean camber that is concave towards the clad outboard side 204. By this configuration, a relative high pressure is created in an atmosphere on an inboard side 102 of the wheel assembly and a relative low pressure is created in the atmosphere on an outboard surface 204 of the wheel assembly as the wheel assembly is rotated. Put another way, the pressure in the atmosphere on the inboard surface 102 of the wheel 100 relative to the outboard side 204 of the wheel assembly 10 is less. It will be appreciated that the pressure on the outboard surface 204 of the clad 200 could be less relative to the inboard surface 102 of the wheel 100 due to the combined geometries of each, being designed in conjunction to create an airflow either inward or outward relative to the outboard surface 204 of the clad 200 in order to create a positive effect on the overall vehicle drag coefficient.

Figure 6:
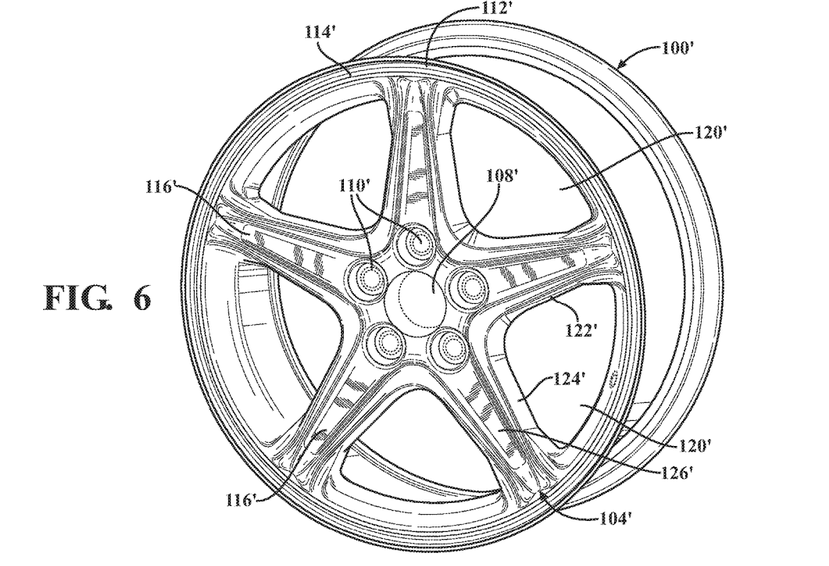
FIG. 6 is a perspective view of a wheel for a wheel assembly in accordance with another aspect of the present disclosure.
Figure 7:
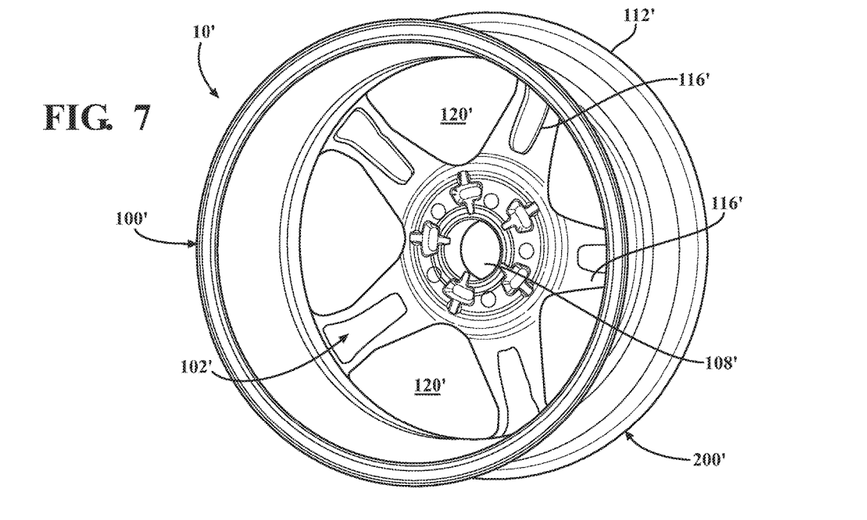
FIG. 7 is a rear perspective view of the wheel of FIG. 6.
Figure 8:
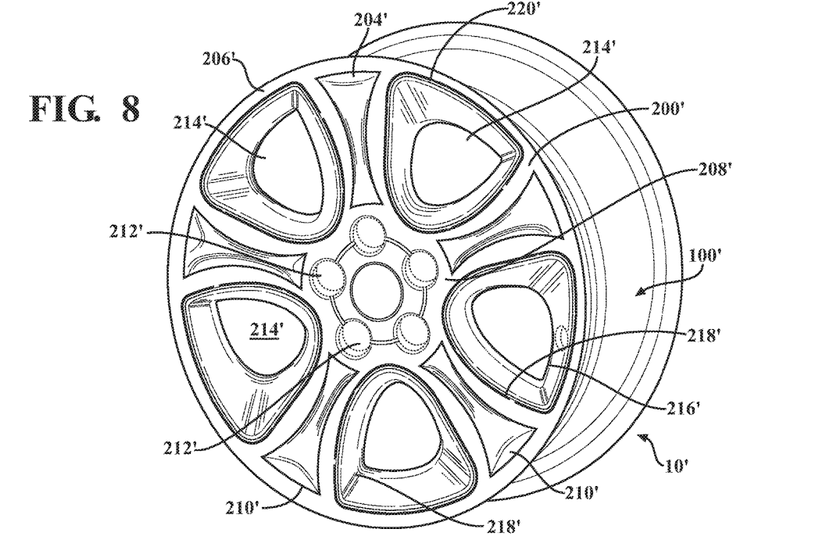
FIG. 8 is front perspective view of a wheel assembly in accordance with a further aspect of the present disclosure.

FIGS. 6 through 7 illustrate a wheel 100' for a wheel assembly 10' in accordance with the present disclosure. According to an aspect, the wheel assembly 10' includes a wheel 100' and wheel clad (not shown). The wheel assembly 10' may have the same configuration as the wheel assembly 10 discussed above in connection with FIGS. 1-5B.

With reference to FIGS. 8 through 11, an exemplary wheel clad 200' of the disclosed wheel assembly 10' in accordance with another aspect is illustrated as permanently attached to the wheel 100'. The wheel clad 200' has an inboard surface 202' and an outboard surface 204'. The wheel clad 200' has a clad outer peripheral portion 206' that is intended to axially align with or overlie at least a portion of the wheel outer peripheral flange surface 114'. The wheel clad 200' includes an inner opening portion 208' that can be axially aligned with or overlie at least a portion of the wheel inner hub portion 106'. The wheel clad 200' can also include a plurality of clad spokes 210' that extend radially between the clad outer peripheral portion 206' and the clad inner opening portion 208'. The clad spokes 210' may at least partially align with and overlap the wheel spokes 116'. The clad outer peripheral portion 206', the clad inner opening portion 208', and the clad spokes 210' cooperate to define a plurality of clad turbine openings 212'. The clad 200' also can include a plurality of lug bolt receiving holes 212' formed therein for receiving lugs within an inner opening portion 208' for providing a "snap-in" center cap. It will be appreciated that the clad turbine openings according to the present disclosure can have a variety of different shapes and sizes and can be located in different places on the clad 200'.

The wheel clad 200' may be permanently secured to the wheel 100' such that the clad inboard side 202' faces the wheel outboard side surface 104'. The plurality of clad turbine openings 214' can each have a clad turbine opening perimeter 216' that may be defined by opposing side surfaces 218' of adjacent clad spokes 210' and an inner periphery 220' of the clad outer rim portion 206'. As shown, the side surfaces 218' may extend generally toward the wheel outboard surface 104' and may have a generally curved or arcuate shape. The plurality of clad turbine openings 214' may be generally axially aligned with the wheel turbine openings 120', such that each clad turbine opening perimeter 216' is disposed entirely within a respective one of the wheel turbine openings 120'. According to an aspect, each of the plurality of clad turbine openings 214' has a second area ($A_2$) defined by the clad turbine opening perimeter 216'. Each of the plurality of clad turbine openings 214' may be substantially smaller in size than the plurality of wheel turbine openings 120'. Put another way ($A_2$) is substantially smaller than ($A_1$). Indeed, for example, the clad turbine opening perimeter 216' is close to 50% smaller than the wheel turbine opening perimeter 130', as shown.

Figure 9:
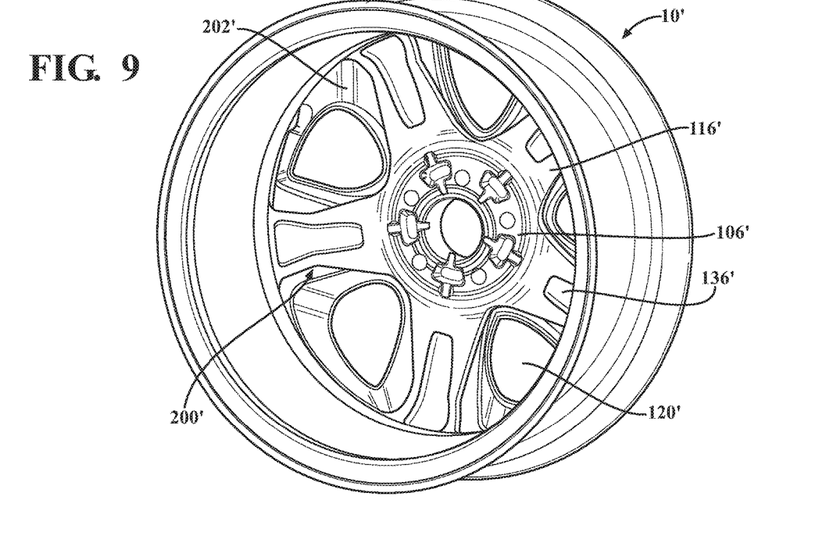
FIG. 9 is a rear perspective view of the wheel assembly of FIG. 8.
Figure 10:
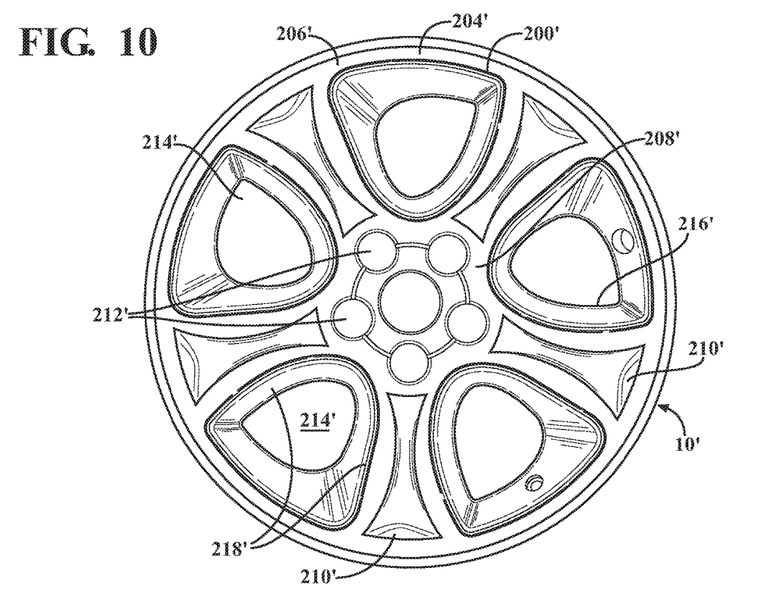
FIG. 10 is front view of a wheel assembly in accordance with still another aspect of the disclosure.
Figure 11:
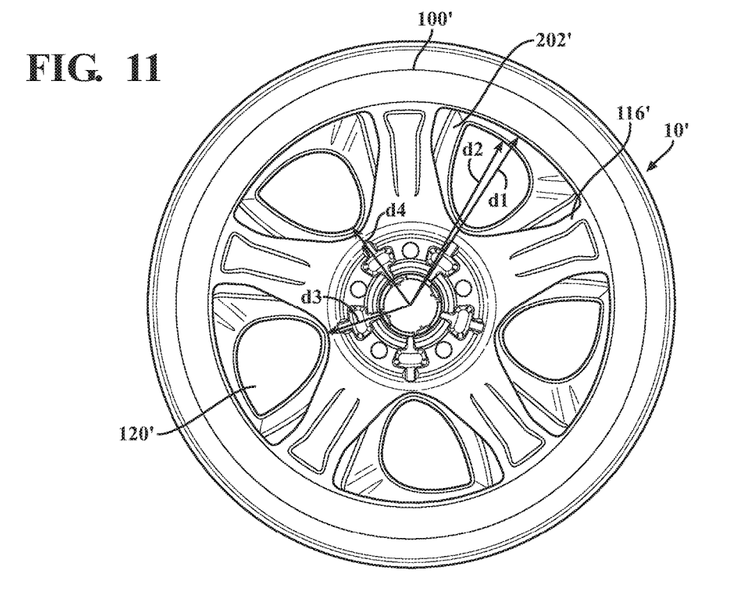
FIG. 11 is a rear view of the wheel assembly of FIG. 10.

The clad 200' may have its outboard surface 204' designed for aerodynamic optimization. According to an aspect, the area ($A_1$) of the wheel turbine openings 116', as defined by the wheel turbine opening perimeter 130', may be significantly larger or greater than the area ($A_2$) of the clad turbine opening 214', as defined by the clad turbine opening perimeter 216'. Additionally, as shown, the wheel turbine openings 120' may extend generally inward toward and partially into the inner hub portion 106' such that the inner hub portion 106' utilizes less material. With reference particularly to FIG. 9, according to an aspect, the clad 200' can extend substantially over the wheel turbine opening periphery 130'. As shown, according to an aspect, the outer peripheral portion 206' may be substantially larger than the peripheral rim portion 112'. For example, the distance ($d_1$) as measured from the wheel center to the wheel inner periphery outer flange surface 132' is substantially greater than the distance ($d_2$) from the wheel center to the inner periphery 220' of the clad outer rim. Additionally, the distance ($d_3$) as measured from the wheel center to the wheel turbine opening perimeter 130' is less than the distance ($d_4$) as measured from the wheel center to the clad turbine opening perimeter 216'. By this configuration, the wheel is optimized for weight with aerodynamics and aesthetics being designed into the clad 200'. Further, the inboard side of the wheel 100' can include a plurality of relief pockets 136' that functions to reduce weight.

Figure 12:
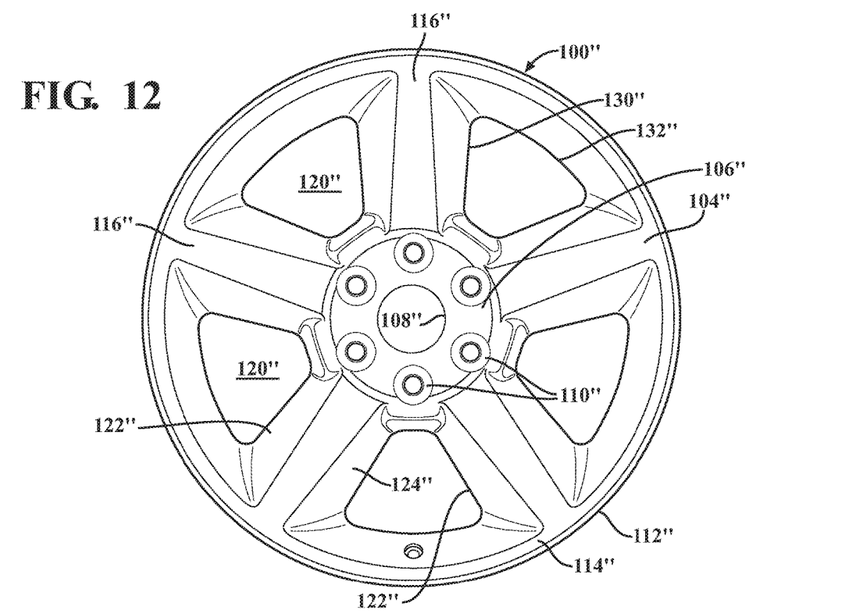
FIG. 12 is a front view of a wheel for a wheel assembly in accordance with still a further aspect of the present disclosure.
Figure 13:
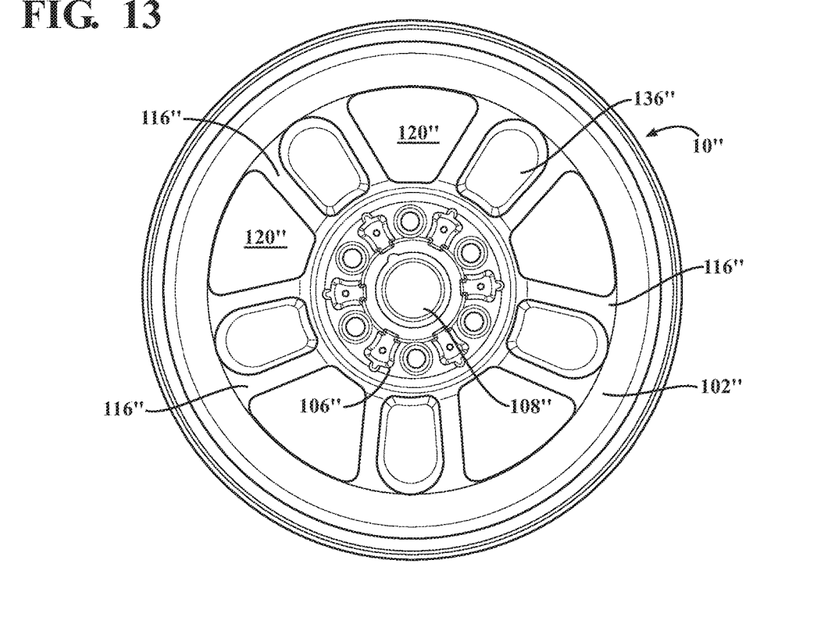
FIG. 13 is a rear view of the wheel of FIG. 12.

FIGS. 12 through 15 illustrate a wheel assembly 10" in accordance with still another aspect of the present disclosure. FIGS. 12 through 13 illustrate a wheel 100" for a wheel assembly 10" in accordance with the present disclosure. The wheel assembly 10" includes a wheel 100" and wheel clad 200". The wheel assembly 10" may have the same configuration as the wheel assembly 10 discussed above in connection with FIGS. 1-5.

Figure 14:
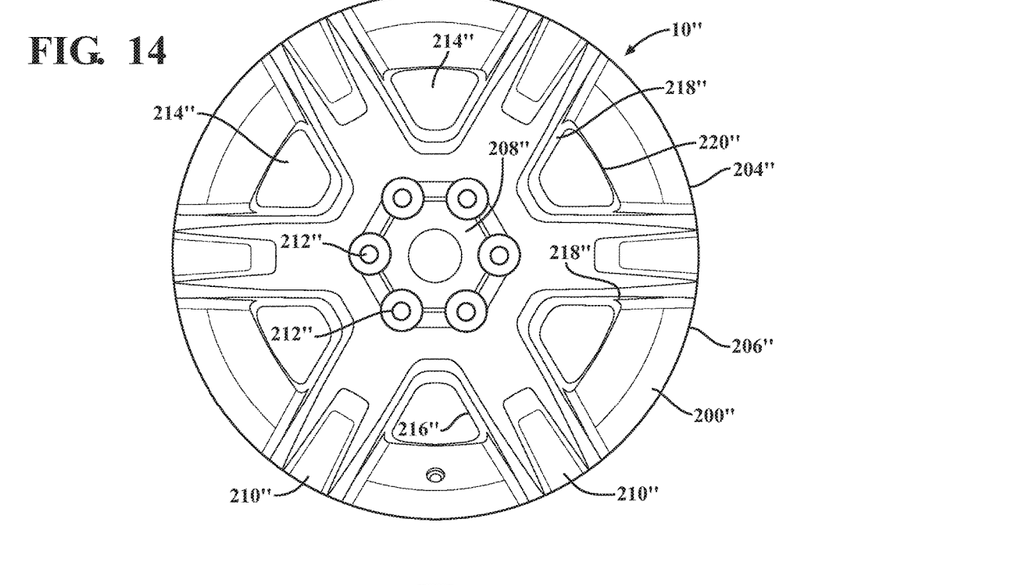
FIG. 14 is a front view of a wheel assembly in accordance with yet another aspect of the present disclosure.
Figure 15:
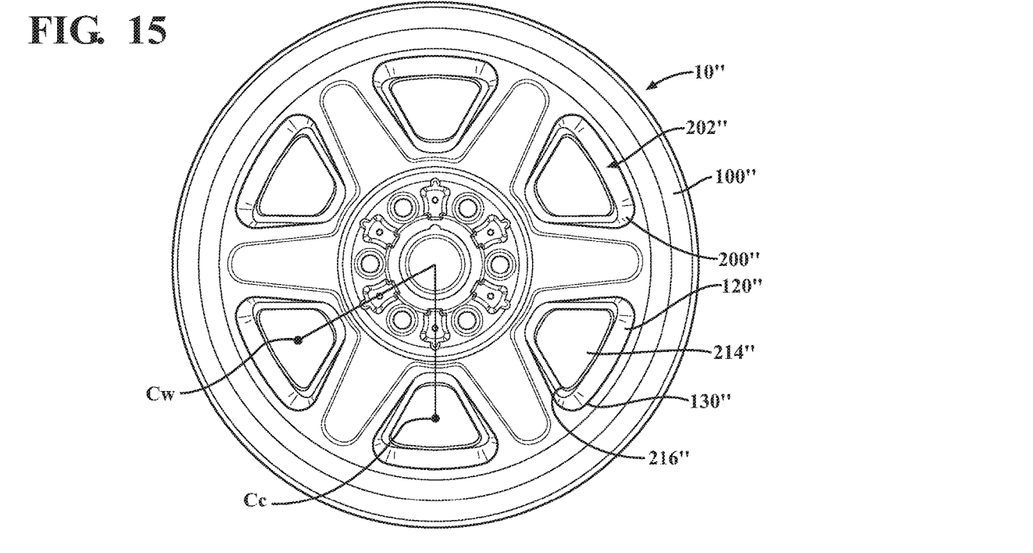
FIG. 15 is a rear view of the wheel assembly of FIG. 14.

With reference to FIGS. 14 through 15, an exemplary wheel clad 200" of the disclosed wheel assembly 10" in accordance with another aspect is illustrated as permanently attached to the wheel 100". The wheel clad 200" has an inboard surface 202" and an outboard surface 204". The wheel clad 200" has a clad outer peripheral portion 206" that is intended to axially align with or overlie at least a portion of the wheel outer peripheral flange surface 114". The wheel clad 200" can include an inner opening portion 208" that can be axially aligned with at least a portion of the wheel inner opening portion 106". The wheel clad 200" also includes a plurality of clad spokes 210" that extend radially between the clad outer peripheral portion 206" and the clad inner opening portion 208". The clad spokes 210" may at least partially align with and overlap the wheel spokes 116". The clad outer peripheral portion 206", the clad inner opening portion 208", and the clad spokes 210" cooperate to define a plurality of clad turbine openings 214". The clad 200" also can include a plurality of lug bolt receiving holes 212" formed therein for receiving lugs. It will be appreciated that the clad turbine openings according to the present disclosure can have a variety of different shapes and sizes and can be located in different places on the clad 200'.

The wheel clad 200" may be permanently secured to the wheel 100" such that the clad inboard side 202" faces the wheel outboard side surface 104". The plurality of clad turbine openings 214" can each have a clad turbine opening perimeter 216" that may be defined by opposing side surfaces 218" of adjacent clad spokes 210" and an inner periphery 220" of the clad outer rim portion 206". As shown, the side surfaces 218" can extend generally toward the wheel outboard surface 104" and may have a generally planar configuration. The plurality of clad turbine openings 214" may be generally axially aligned with the wheel turbine openings 120", such that each clad turbine opening perimeter 216" is disposed entirely within a respective one of the wheel turbine openings 120". According to an aspect, each of the plurality of clad turbine openings 214" has a second area ($A_2$) defined by the clad turbine opening perimeter 216". Each of the plurality of clad turbine openings 214" may be substantially smaller in size than the plurality of wheel turbine openings 120". Put another way ($A_2$) is substantially smaller than ($A_1$).

As shown, the clad 200" may have its outboard surface 204" designed for aerodynamic optimization. According to an aspect, the area ($A_1$) of the wheel turbine openings 120", as defined by the wheel turbine opening periphery 130", may be significantly larger or greater than the area ($A_2$) of the clad turbine opening 214", as defined by the clad turbine opening perimeter 216". Additionally, as shown, the wheel turbine openings 120" may extend generally inward toward and partially into the inner hub portion 106" such that the inner hub portion 106" utilizes less material. By this configuration, mass at the wheel rim section is displaced by cladding, which results in the reduction of mass and the mass moment of inertia. Moreover, according to an aspect, the clad turbine openings 214" may be moved inward toward the inner hub portion 106" such that the ventilation drag of the wheel assembly is reduced and hydraulic wheel efficiency of the wheel assembly is increased. For example, the geometric center ($C_c$) of the clad turbine opening 214" may be disposed radially inwardly with respect to the geometric center ($C_w$) of the wheel turbine opening 120". This can be seen in FIG. 15 where the distance from the wheel center to $C_w$ is substantially greater than the distance from the wheel center to $C_c$. This can result in a decrease in the mass moment of inertia of the wheel assembly 10". With reference particularly to FIG. 15, the clad 200" extends substantially over the wheel turbine opening periphery 130". As shown, according to an aspect, the outer peripheral portion 206" may be substantially larger than the peripheral rim portion 112". By this configuration, the wheel is optimized for weight with aerodynamics and aesthetics being designed into the clad 200".

Figure 16:
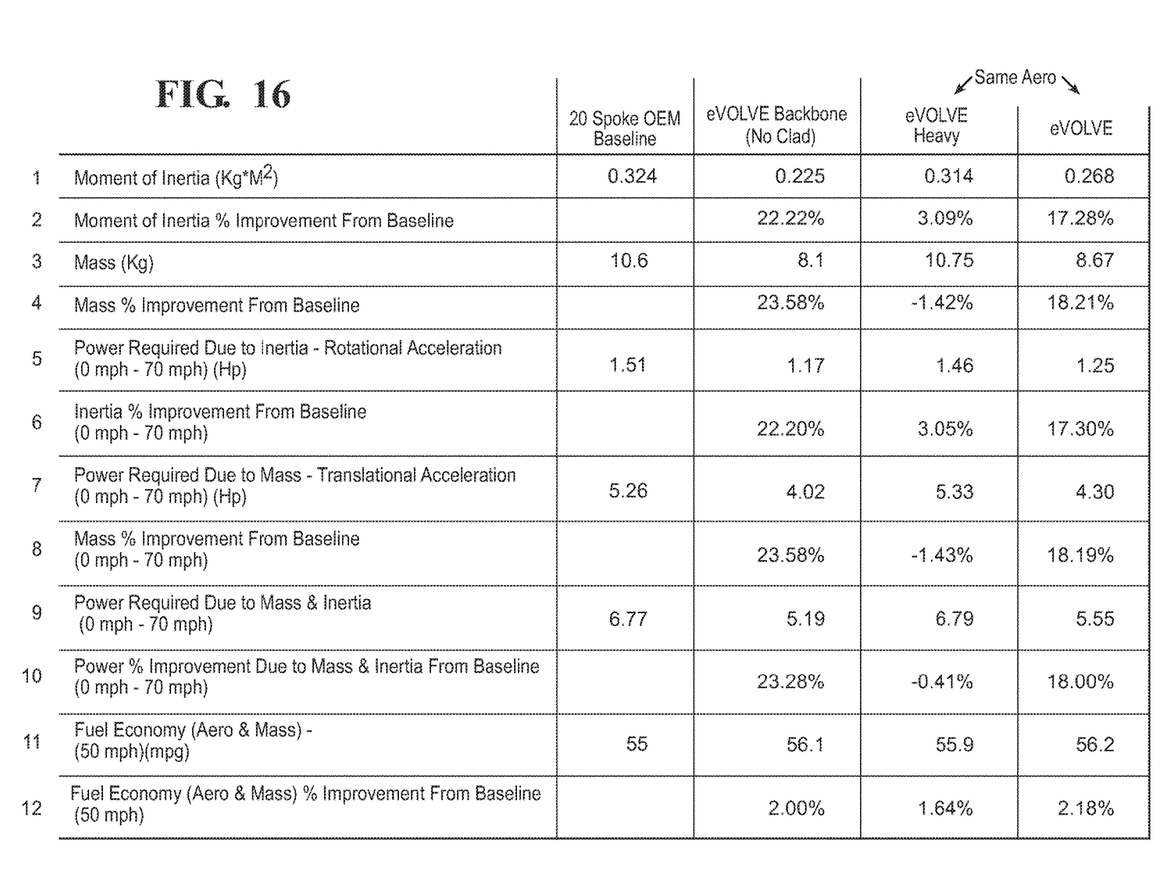
FIG. 16 is an exemplary table illustrating aspects of a wheel assembly in accordance with aspects of the present disclosure.

FIG. 16 schematically illustrates exemplary benefits of the various aspects of the present disclosure. As shown, certain characteristics of a wheel assembly in accordance with the present disclosure were tested and evaluated in comparison to existing wheels. This data is presented for purposes of illustration and is not is intended to be limited. Column 1 reflects data for an exemplary 20 spoke OEM wheel. This exemplary wheel is utilized as a baseline for comparison of the other samples. Column 2 reflects data for a wheel made in accordance with the present disclosure with no wheel clad attached to its outer board surface. Column 3 reflects data of a wheel assembly, consisting of a wheel and a wheel clad in accordance with the present disclosure. However, the wheel was weighted down to try and mimic the weight of an existing wheel assembly (Evolve) not made in accordance with the present disclosure. Column 4 reflects data of a wheel assembly, including a wheel and a wheel clad constructed in accordance with the present disclosure.

The first row in the table reflects the measured moment of inertia for each of the samples. The second row reflects the improvement in the moment of inertia over the baseline 20 inch OEM wheel for each sample. As shown, the wheel constructed in accordance with the present disclosure as well as the wheel assembly constructed in accordance with the present disclosure demonstrated significant improvements in this area. The third row indicates the mass of each of the samples and the fourth row reflects the decrease in mass as compared to the baseline 20 inch OEM wheel. The fifth row indicates the power required due to inertia—rotational acceleration (spinning). The sixth row reflects the inertia % improvement from the baseline. Again, the wheel and the wheel assembly constructed in accordance with an aspect of the disclosure demonstrate marked improvement over the baseline.

The seventh row indicates the power required due to mass—translational acceleration (lateral movement). The eighth row reflects that power % improvement over the baseline 20 inch OEM wheel. The ninth row indicates the power required due to mass and inertia and the tenth row reflects the improvement in this area over the baseline. The eleventh row reflects the fuel economy effect due to the combination of aerodynamics and mass for each of the samples. The twelfth row reflects the fuel economy % improvement over the baseline. The tests for the eleventh and twelfth rows were conducted pursuant to SAE J2263 and SAE J2264.

In accordance with another aspect, the plurality of wheel spokes and the plurality of clad spokes cooperate to define a mean camber that is concave towards the clad outer surface, such that a relative high pressure is created in an atmosphere on an inner side of the wheel assembly and a relative low pressure is created in the atmosphere on an outer side of the wheel assembly as the wheel assembly is rotated. Alternatively, a mean camber could be included that is concave toward the clad outer surface such that the relative high pressure is created on an inner side of the wheel assembly and the relative low pressure is created on an outer side of the wheel assembly as the wheel assembly is rotated. According to still a further aspect, the pressure on the outside of the clad could be less relative to the inner side of the wheel due to the combined geometries of the wheel and the clad being designed in conjunction to create an airflow either inward or outward relative to the outer surface of the clad in order to create a positive effect on overall vehicle drag coefficient.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A composite wheel assembly, comprising:
a wheel portion having a wheel outer rim portion, a wheel inner hub portion adapted to receive an axle therethrough, and a plurality of wheel spokes extending radially between the wheel outer rim portion and the wheel inner hub portion, wherein the wheel outer rim portion, the wheel inner hub portion and the wheel spokes cooperate to form a wheel outer surface having a first drag coefficient and a plurality of wheel turbine openings therein each having a first turbine opening area, and wherein the wheel portion has an inboard side;
at least one weight relief feature formed in the inboard side of at least one of the plurality of wheel spokes to minimize wheel mass;
a permanently bonded wheel clad including a clad outer rim portion axially aligned with at least a portion of the wheel outer rim portion, a clad inner hub portion axially aligned with at least a portion of the wheel inner hub portion, and a plurality of clad spokes extending radially between the clad outer rim portion and clad inner hub portion, wherein the clad outer rim portion, the clad inner hub portion and the clad spokes cooperate to define a clad inner surface having a plurality of clad turbine openings each having a second turbine opening area, the wheel clad being permanently secured to the wheel portion such that the clad inner surface faces the wheel outer surface, and wherein the wheel clad has an outboard side;
the wheel clad having a clad outer surface with a second drag coefficient which is less than the first drag coefficient of the wheel outer surface, and
wherein the area of the wheel turbine openings is larger than the area of the clad turbine openings such that the outboard side of the wheel clad has a different design configuration from the outer surface of the wheel portion, and
wherein the second clad turbine opening area is at least 17% less than the first wheel turbine opening area.

2. The wheel assembly of claim 1, wherein the at least one weight relief feature consists of a relief pocket formed in at least one of the wheel spokes.

3. The wheel assembly of claim 2, wherein the at least one weight relief feature includes a plurality of weight relief features.

4. The wheel assembly of claim 3, wherein the plurality of weight relief features consist of at least one relief pocket formed in each of the plurality of wheel spokes.

5. The wheel assembly of claim 1, wherein a first distance as measured from a wheel center to the wheel outer rim portion is greater than a second distance as measured from the wheel center to the clad outer rim portion.

6. The wheel assembly of claim 1, wherein a geometric center of each of the clad turbine openings is disposed radially inwardly with respect to a geometric center of an associated wheel turbine opening as measured from a wheel center.

7. The wheel assembly of claim 1, wherein the wheel clad is permanently bonded to the wheel portion by a foam adhesive.

8. The wheel assembly of claim 1, wherein the second drag coefficient is greater than or equal to about 0.003 less than the first drag coefficient.

9. The wheel assembly of claim 8, wherein the second drag coefficient is greater than or equal to about 0.006 less than the first drag coefficient.

10. A composite wheel assembly, comprising:
a wheel portion having a wheel outer rim portion, a wheel inner hub portion adapted to receive an axle therethrough, and a plurality of wheel spokes extending radially between the wheel outer rim portion and the wheel inner hub portion, wherein the wheel outer rim portion, the wheel inner hub portion and the wheel spokes cooperate to form a wheel outer surface having a plurality of wheel turbine openings therein, and wherein the wheel portion has an inboard side;
a permanently bonded wheel clad including a clad outer rim portion axially aligned with at least a portion of the wheel outer rim portion, a clad inner hub portion axially aligned with at least a portion of the wheel inner hub portion, and a plurality of clad spokes extending radially between the clad outer rim portion and clad inner hub portion, wherein the clad outer rim portion, the clad inner hub portion and the clad spokes cooperate to define a clad inner surface having a plurality of clad turbine openings, the wheel clad being permanently secured to the wheel portion such that the clad inner surface faces the wheel outer surface, and wherein wheel clad has an outboard side with a specified design;
the wheel portion having a wheel center configured to be located at an axis of rotation of the wheel assembly;
wherein each of the plurality of wheel spokes includes a mass reduction feature formed on an inboard side thereof to minimize wheel mass,
wherein a first distance as measured from the wheel center to the wheel outer rim portion is greater than a second distance as measured from the wheel center to the clad outer rim portion which results in a reduced mass moment of inertia,
wherein each of the plurality of wheel turbine openings have a first wheel turbine opening area and each of the plurality of clad turbine openings have a second clad turbine opening area,
wherein the first wheel turbine opening area is greater than the second clad turbine opening area, and
wherein the second clad turbine opening area is at least 17% less than the first wheel turbine opening area.

11. The wheel assembly of claim 10, wherein the wheel clad is permanently attached to the wheel portion by a foam adhesive.

12. The wheel assembly of claim 10, wherein the mass reduction feature of each of the wheel spokes includes a relief pocket.

13. The wheel assembly of claim 10, wherein the mass reduction feature of each of the wheel spokes has a hollow pocket.

14. The wheel assembly of claim 10, wherein the mass reduction feature of each of the wheel spokes are configured as an I-beam.

15. The wheel assembly of claim 10, wherein the wheel portion includes an outer surface with a first drag coefficient and the wheel clad includes an outer surface with a second drag coefficient;
wherein the second drag coefficient is greater than or equal to about 0.003 less than the first drag coefficient.

16. The wheel assembly of claim 15, wherein the second drag coefficient is greater than or equal to about 0.006 less than the first drag coefficient.

17. The wheel assembly of claim 10, wherein a geometric center of each of the clad turbine openings is disposed inwardly with respect to the geometric center of an associated wheel turbine opening as measured from the wheel center.

18. A composite wheel assembly, comprising:
a wheel portion having a wheel outer rim portion, a wheel inner hub portion adapted to receive an axle therethrough, and a plurality of wheel spokes extending radially between the wheel outer rim portion and the wheel inner hub portion, wherein the wheel outer rim portion, the wheel inner hub portion and the wheel spokes cooperate to form a wheel outer surface having a plurality of wheel turbine openings therein, and wherein the wheel portion has an inboard side;
a wheel clad including a clad outer rim portion axially aligned with at least a portion of the wheel outer rim portion, a clad inner hub portion axially aligned with at least a portion of the wheel inner hub portion, and a plurality of clad spokes extending radially between the clad outer rim portion and clad inner hub portion, wherein the clad outer rim portion, the clad inner hub portion and the clad spokes cooperate to define a clad inner surface having a plurality of clad turbine openings, the wheel clad being permanently secured to the wheel portion such that the clad inner surface faces the wheel outer surface, and wherein wheel clad has an outboard side with a specified design;
the wheel portion having a wheel center configured to be located at an axis of rotation of the wheel assembly;
wherein each of the plurality of wheel turbine openings have a first wheel turbine opening area and each of the plurality of clad turbine openings have a second clad turbine opening area, wherein the first wheel turbine opening area is greater than the second clad turbine opening area, and
wherein a geometric center of each of the clad turbine openings is disposed inwardly with respect to the geometric center of an associated wheel turbine opening as measured from the wheel center.

* * * * *